Patented June 28, 1927.

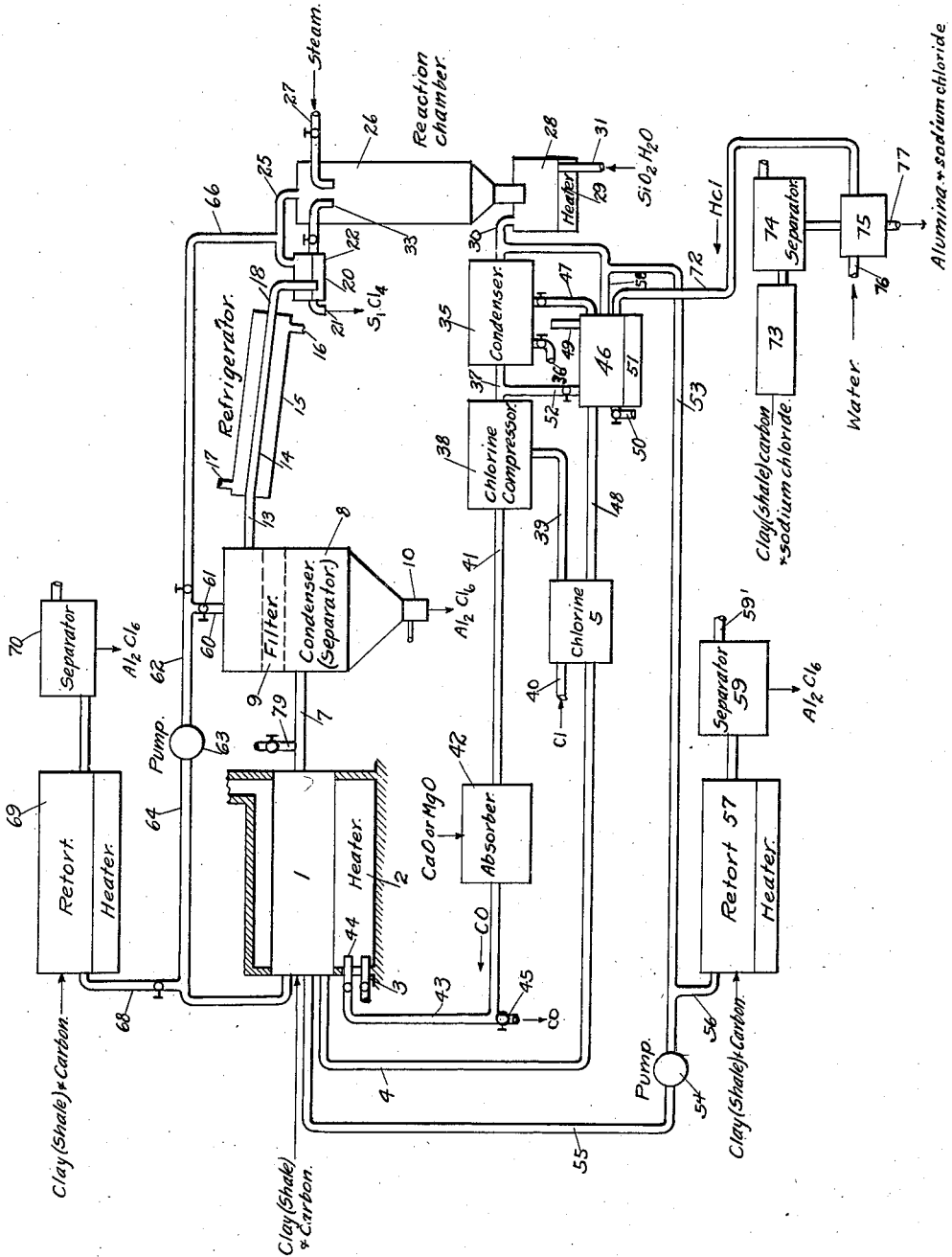

1,633,835

UNITED STATES PATENT OFFICE.

EDSON R. WOLCOTT, OF LOS ANGELES, CALIFORNIA, ASSIGNOR, BY MESNE ASSIGNMENTS, TO THE TEXAS COMPANY, OF NEW YORK, N. Y., A CORPORATION OF DELAWARE.

ALUMINUM-CHLORIDE PRODUCTION.

Application filed February 2, 1921. Serial No. 441,783.

This invention relates to the production of aluminum chloride from clay, shale, or other similar material, together with carbon, or carbonaceous material, and the main object of the invention is to provide for utilization of other products which may be produced as by-products in the production of aluminum chloride from these materials.

In the production of aluminum chloride by heating clay, or shale, or like material, together with carbon in the presence of chlorine there is generally produced more or less silicon tetrachloride and an important object of the invention is to utilize such silicon tetrachloride in an economical manner and preferably in such manner as to recover the chlorine content thereof for cyclic use in the process.

A further object of the invention is to provide for the production of a valuable by-product from such silicon tetrachloride consisting of silica, preferably in the form of a "gel".

The accompanying drawing is a flow sheet showing the manner in which the process may be carried out.

My process may be carried out as follows: Clay (shale, or other argillaceous material) is mixed with carbon in any suitable manner, either by crushing and grinding the clay with coke, or other form of carbon, or by mixing the clay with petroleum, bituminous coal, or other carbonaceous material, and subjecting the same to distillation, or by subjecting a naturally occurring mixture of clay, or shale and carbonaceous material (such, for example, as oil shale, or low grade coal) to destructive distillation to drive off volatile matter and leave a residue of carbon in contact with clay or aluminum silicate. The mixture of aluminum silicate material and carbon produced in any of the ways above described is subjected to heat in a retort 1, which may be the same retort in which the distilling operation above referred to has been carried on, or which may be another retort. Retort 1 may be of any suitable type, for example, of the usual horizontal type such as used in gas retorts, or it may be of vertical type, and it may be adapted for either batch operation or continuous operation. The retort 1 is heated by any suitable means, for example, by a heater, furnace, or combustion chamber 2, provided with suitable burner means 3. Chlorine is conducted into said retort by a suitable pipe or connection 4 from a tank or other source of chlorine, indicated at 5, and the retort 1 is maintained at such temperature as to cause the production and volatilization of aluminum chloride, which passes off through an outlet pipe 7 to a collecting or separating chamber 8, which may consist, for example, of a condenser provided with a filter 9 and with an outlet 10 for removing the condensed and separated aluminum chloride, it being understood that such aluminum chloride will, at ordinary temperature, be in solid, finely divided condition, and should be maintained during the operation, and at all times thereafter, out of contact with the atmosphere so as to prevent access of moisture thereto. The aluminum chloride so obtained may be utilized for any purpose, for example, in the refining of petroleum, and constitutes the main product of the process hereinafter described.

Other products of the reaction taking place in the retort 1 comprise carbon monoxide, carbon dioxide, and silicon tetrachloride, and these products pass off through the outlet 7 along with the aluminum chloride and with residual chlorine, it being understood that it is generally desirable to use a considerable excess of chlorine in the operation. Part or all of the residual gases from the apparatus 8 may pass through an outlet pipe 13 to a refrigerator, comprising, for example, a pipe 14 wherein they are subjected to refrigerating action by means of a refrigerating medium passing through a jacket 15 surrounding the refrigerating pipe 14, said medium being conducted through said jacket by inlet and outlet means, indicated at 16 and 17. The outlet pipe 18 of said refrigerator extends into a trap 20 having an outlet 21 for liquid above the bottom of the pipe 18, so as to maintain a liquid seal 22 preventing back flow or diffusion of any gas or vapor into the refrigerator line from the succeeding parts of the apparatus, and thereby preventing access of moisture to the aluminum chloride passing from the retort 1.

The residual gas passing from the trap 20 will, in general, contain some of the silicon tetrachloride as well as excess chlorine present in the gases passing from the retort, In order to utilize such residual silicon tetrachloride, I prefer to treat the gas passing from the trap 20 in such manner as to produce hydrochloric acid as a by-product. For this purpose such gases are introduced by means of an outlet pipe 25 leading from the trap 20 into a reaction chamber 26, which is also provided with a steam supply pipe 27. In this chamber the reaction takes place between the silicon tetrachloride and water, resulting in the production of hydrochloric acid and of silica, sufficient water being supplied in the form of steam, or otherwise, to combine with the silica, forming a gelatinous product, or "gel", which may be withdrawn from the reaction chamber 26 into a chamber 28 and may therein be separated from the hydrochloric acid in any suitable manner. For example, the chamber 28 may, by means of heating means indicated at 29, be maintained at such temperature as to cause the hydrochloric acid to be evolved through outlet pipe 30 as a mixture of hydrochloric acid and water of a definite boiling point, leaving hydrated silica in the chamber 28, and such hydrated silica may be withdrawn from said chamber through a pipe 31 and treated in any suitable manner to remove or neutralize any remaining acid therein. Such silica "gel" constitutes a valuable by-product of the operation, having a recognized value as an absorbent for gases. It may, moreover, be dehydrated so as to constitute a dry, hard, granular product suitable for use as pure silica in glass making, or for other purposes.

The silicon tetrachloride separated in trap 20 may be passed partly or completely through a pipe 33 to the reaction chamber 26 so as to be utilized in the production of silica and hydrochloric acid, or any desired portion of this silicon tetrachloride separated in trap 20 may pass out through the outlet pipe 21 for use or sale as a by-product of the reaction. The hydrochloric acid produced as above described may be separated from the residual gases in any suitable manner, for example, such gases may pass through a condenser 35 wherein the larger portion of the hydrochloric acid is separated out along with a definite amount of water to form a definite solution of hydrochloric acid in water, which is withdrawn through outlet 36. The residual gases may then pass through a pipe 37 to means for separating the chlorine content thereof, for example, a chlorine compressor, indicated at 38, wherein the gases are subjected to sufficient compression and refrigeration, if necessary, to separate the chlorine which is withdrawn through the pipe 39 to any suitable receiving means, for example, the chlorine receptacle or source 5, above referred to, such receptacle or source being, however, also provided with means, indicated at 40, for supply of additional chlorine thereto to compensate for loss in the process. From the chlorine separator 38 the residual gases may pass through the pipe 41 to an absorber 42 for removing therefrom the residual chlorine and hydrochloric acid carried thereby, such absorber consisting, for example, of a lime tower, or chamber, or an absorption chamber in which the gases are brought in contact with lime, magnesia, or other alkaline material capable of absorbing hydrochloric acid and chlorine, suitable conditions of moisture and temperature being maintained in such chamber to insure such absorption. The residual gases passing from the absorber 42 will, in general, comprise a considerable proportion of carbon monoxide and may be conducted by pipe 43 to the heating means 2 for the retort 1, introduction of such residual gases to the heat being effected by a burner 44, or otherwise, so as to effect combustion of the carbon monoxide and utilization thereof in furnishing a portion of the heat required for the production and distillation of aluminum chloride and silicon tetrachloride in said retort. Part or all of the residual gases containing carbon monoxide may, however, pass through an outlet pipe 45 to any suitable means for utilizing such carbon monoxide.

The hydrochloric acid produced, as above described, and separated in the chamber 35 constitutes a valuable by-product and may be disposed of as such, or a part or all of such hydrochloric acid may be passed by means of pipe 47 through a suitable catalyzer, indicated at 46, to produce chlorine, which is conducted, by means of pipe 48, to the chlorine receptacle 5 aforesaid. Catalyzer 46 may be of any suitable type, being provided with supply means 49 for admitting oxygen, or oxygen-bearing gas, thereto for reaction with the hydrochloric acid to form chlorine and water, the water passing off through outlet 50. Suitable means, such as heater 51, are provided for maintaining such catalyzer at required temperature for the reaction and any suitable catalyzing agent is provided therein, for example, cupric oxide. If found desirable, the chlorine necessary for operation of the system may be produced by this catalyzer from hydrochloric acid obtained from any suitable source and supplied through a pipe 72. For example, such hydrochloric acid may be generated by the action of water on aluminum-sodium chloride produced in a retort 73 by heating sodium chloride with clay (shale) and carbon, and the double chloride being separated from the retort gases by a separator 74 and treated in a tank 75, with water introduced at 76, alumina and sodium chloride passing off at 77 and being separated by filtration, or otherwise. The sodium chloride may then be returned to the retort 73 for cyclic operation.

Such catalyzer may also (through a pipe 58) receive the residual gases from the outlet pipe 30 before separation of the hydrochloric acid therefrom, so as to produce chlorine from the hydrochloric acid contained in such residual gases. In that case, it will be desirable to separate the chlorine so produced from the residual gases, the gaseous product from the catalyzer being passed, for example, by pipe 52 in the inlet of the separating device 38 aforesaid.

The residual gases containing carbon monoxide, chlorine and hydrochloric acid, after removal of the silicon tetrachloride therefrom, may pass, for example, from the outlet pipe 30 of the separating chamber 28 by a pipe 53, pump 54 and pipe 55, back to the retort 1, or said pipe 53 may lead to the inlet pipe 56 of another retort 57 similar in construction and operation to the retort 1, so as to utilize the carbon monoxide, chlorine and hydrochloric acid, either in the retort 1 or the retort 57, in the production of an additional amount of aluminum chloride, which is then separated in a separator 58 connected to receive the effluent from the retort 57. If such additional retort 57 is employed, the residual gases, after separation of the aluminum chloride therefrom in the separator 58, may pass to waste, as indicated at 59', or they may pass to suitable means for recovering or utilizing any residual chlorine or silicon tetrachloride remaining therein.

The silicon tetrachloride produced in the retort 1 in passing off from the aluminum chloride separator 8 may be utilized by returning the gases containing the same to the retort 1, for example, by a pipe connection 60 provided with a valve 61 and leading to the inlet pipe 62 of a pump 63, which forces the residual gases through a pipe 64 to the retort 1. Similarly the residual gases, after separation of part of the silicon tetrachloride therefrom, may pass from pipe 25 through a pipe 66 to the inlet pipe 62 of the pump 63. By this means the residual gases containing carbon monoxide, the excess of chlorine used and some silicon tetrachloride may be passed through the retort 1 to effect a further reaction with the aluminum silicate material and carbon therein, so as to produce an additional amount of aluminum chloride. If desired, the residual gases from which the aluminum chloride has been removed may pass through pipe line 68 to a separate retort 69 wherein they are brought into contact with clay or aluminum silicate material and carbon and therein subjected to heating operation to produce a further amount of aluminum chloride which is separated from the effluent gases by a separator 70, the residual gases passing to waste at 71, or being operated upon similarly to the effluent gases from the retort 1, to recover by-products therefrom. The residual gases from which part or all of the silicon tetrachloride has been removed may also pass through pipes 66, 62, 64 and 68 to such separate retort 69. In case oil shale, or low grade coal is heated in the retort 1 to furnish the mixture of aluminum silicate material and carbon, the combustible hydrocarbon gases or vapors produced by distillation of such oil shale, or low grade coal, may be conducted by a flue or pipe 79 to any suitable means for utilizing the same, either by condensing valuable products therefrom, or by burning the same as fuel, in the heater 3, or elsewhere.

What I claim is:

1. The process for producing aluminum chloride which consists in heating aluminum silicate material in the presence of carbon and chlorine to produce aluminum chloride and silicon tetrachloride, withdrawing the gases resulting from such reaction, cooling the gases to condense and collect the aluminum chloride and then to condense and collect silicon tetrachloride, and maintaining a body of silicon tetrachloride so condensed in the path of the effluent gases to produce a liquid seal to prevent access of moisture to the aluminum chloride.

2. The process of treating gases and vapors resulting from heating aluminum silicate material and carbon in the presence of chlorine, said gases and vapors comprising aluminum chloride and silicon tetrachloride, which consists in separating aluminum chloride from such gases and vapors and reacting on the silicon tetrachloride contained in such gases and vapors with water to produce hydrochloric acid and silica, and separating such hydrochloric acid and silica.

3. A process, as set forth in claim 2, wherein such hydrochloric acid is treated for recovery of chlorine therefrom, and such chlorine utilized for production of a further amount of aluminum chloride by heating the same in the presence of aluminum silicate material and carbon.

4. The process of manufacturing aluminum chloride that comprises heating aluminum silicate material in the presence of chlorin and a reducing agent to produce vapors comprising aluminum chloride, separating aluminum chloride from said vapors, withdrawing the remaining vapors and maintaining a liquid seal in the path of said vapors by condensation of constituents thereof.

5. In the manufacture of aluminum chloride by treating aluminous material with chlorine in the presence of heat and a reducing agent, the process that comprises separating the aluminum chloride from the evolved vapors and maintaining a liquid seal in the path of the remaining vapors by condensation of constituents thereof.

6. The process of manufacturing aluminum chloride that comprises treating aluminum ore containing silicon compound with a chloridizing agent in the presence of a reducing agent to form vapors comprising aluminum chloride and a silicon chloride, subjecting said vapors to cooling to condense the aluminum chloride, subjecting the remaining vapors to further cooling to produce a condensate comprising said silicon chloride and maintaining a liquid seal of said condensate in the path of the effluent vapors.

7. The process of manufacturing aluminum chloride that comprises treating aluminum ore with a chloridizing agent in the presence of a reducing agent to form vapors comprising aluminum chloride and more volatile chlorides, cooling said vapors to condense aluminum chloride, subjecting the remaining vapors to further cooling to produce a condensate comprising said more volatile chlorides and maintaining a liquid seal of said condensate in the path of the effluent vapors.

8. The process of manufacturing aluminum chloride that comprises treating aluminum silicate material with a chloridizing agent in the presence of a reducing agent to produce vapors comprising aluminum chloride and silicon tetrachloride, condensing aluminum chloride and silicon tetrachloride from said vapors separately and utilizing the uncondensed gases comprising chlorine and carbon monoxid in treating an additional quantity of aluminum silicate material.

9. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, treating the remaining vapors comprising silicon tetrachloride with steam to form a solution containing silica and hydrochloric acid, heating said solution and condensing the hydrochloric acid and water vapors evolved to form a hydrochloric acid solution, bringing said hydrochloric acid into contact with oxygen in the presence of a catalyst to produce chlorine and passing said chlorine into contact with heated aluminum silicate material to effect production of aluminum chloride therefrom.

10. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, treating the silicon tetrachloride to produce hydrochloric acid therefrom, oxidizing said acid to produce chlorine and passing said chlorine into contact with heated aluminum silicate material to effect production of aluminum chloride therefrom.

11. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, hydrolyzing the silicon tetrachloride, recovering hydrochloric acid from the products of the hydrolysis, oxidizing said hydrochloric acid to form chlorine and bringing said chlorine into contact with heated aluminum silicate material to effect production of aluminum chloride therefrom.

12. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, hydrolyzing the silicon tetrachloride, heating the resultant solution of the hydrolysis to drive off gases comprising hydrochloric acid gas and chlorine and bringing said gases into contact with heated aluminum silicate material to effect production of aluminum chloride therefrom.

13. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, hydrolyzing the silicon tetrachloride to obtain hydrochloric acid therefrom and bringing said hydrochloric acid into contact with heated aluminum silicate material to effect production of aluminum chloride therefrom.

14. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, hydrolyzing the silicon tetrachloride, heating the products of the hydrolysis, condensing the resultant water vapors and hydrochloric acid to form a hydrochloric acid solution, subjecting the uncondensed gases to compression to separate chlorin therefrom and passing said chlorin into contact with heated aluminum silicate material to effect production of aluminum chloride therefrom.

15. The process of manufacturing aluminum chloride that comprises treating aluminum silicate material with a chloridizing agent in the presence of a reducing agent to form vapors comprising aluminum chloride and silicon tetrachloride, separating aluminum chloride from said vapors, treating the remaining gases including silicon tetrachloride with water, heating the products of the hydrolysis to evolve vapors comprising hydrochloric acid, passing said vapors into a catalytic chamber in the presence of oxygen to form chlorine, subjecting the effluent gases from said catalytic chamber to compression to separate the chlorine therefrom and bringing said chlorine into contact with heated aluminum silicate material to effect production of aluminum chloride therefrom.

16. In apparatus for the manufacture of aluminum chloride, a retort adapted to contain materials for the preparation of said chloride, a condenser communicating therewith and adapted to condense aluminum chloride vapors formed, a second condenser communicating with the first and adapted for the condensation of more volatile chlorides, an outlet from said second condenser, a trap within which said outlet terminates, a reaction chamber communicating with said trap, means for admitting steam thereto and means for collecting the resultant products of the reaction.

17. In apparatus for the manufacture of aluminum chloride, a retort adapted to contain materials for the preparation of said chloride, a condenser communicating therewith and adapted to condense aluminum chloride vapors formed, a second condenser communicating with the first and adapted for the condensation of more volatile chlorides, an outlet from said second condenser, a trap comprising a liquid seal within which said outlet terminates, a reaction chamber, a line extending from the vapor space of said trap to said reaction chamber, another line extending from the liquid portion of said trap to the reaction chamber, means for admitting steam to the reaction chamber and means for collecting the products of the reaction.

18. In apparatus for the manufacture of aluminum chloride, a retort adapted to contain materials for the preparation of said chloride, a condenser communicating therewith and adapted for the condensation of aluminum chloride, a second condenser communicating with the first and adapted for the condensation of more volatile chlorides, a trap comprising a liquid seal in communication with said second condenser, means for drawing off gases from the trap and from the aluminum chloride condenser and conveying them to the retort.

In testimony whereof I have hereunto subscribed my name this 25th day of January, 1921.

EDSON R. WOLCOTT.